Feb. 6, 1934.  D. P. McLAUGHLIN  1,946,091
SAFETY ATTACHMENT FOR TYPESETTING MACHINES
Filed March 4, 1931
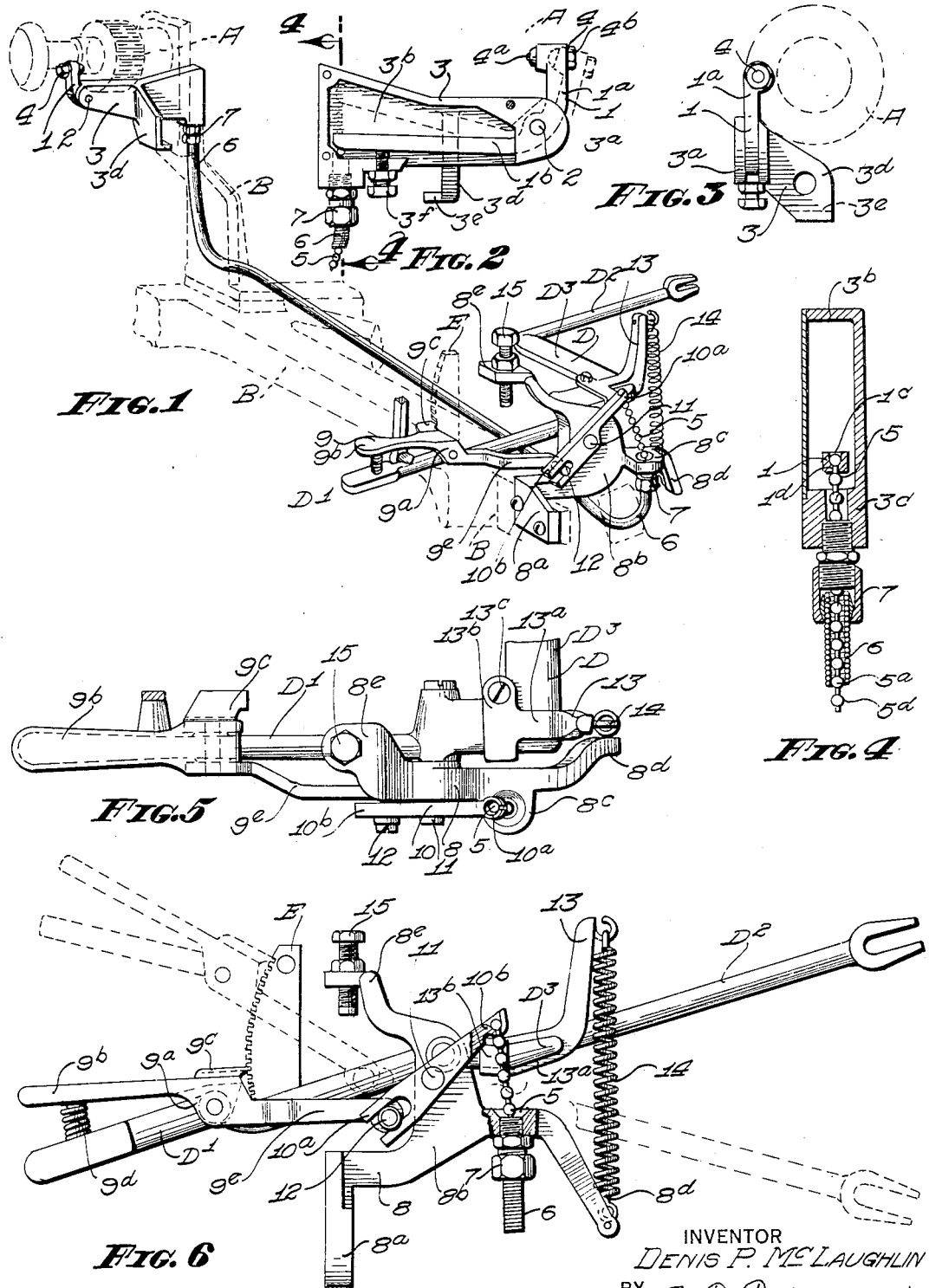
INVENTOR
DENIS P. McLAUGHLIN
BY A. B. Bowman
ATTORNEY Patented Feb. 6, 1934

1,946,091

UNITED STATES PATENT OFFICE 1,946,091

SAFETY ATTACHMENT FOR TYPESETTING MACHINES

Denis P. McLaughlin, San Diego, Calif.

Application March 4, 1931. Serial No. 519,941

3 Claims. (Cl. 199—52)

My invention relates to a safety attachment for typesetting machines, and the objects of my invention are:

First, to provide a safety attachment which may be applied to any typesetting machine, wherein the typesetting machine is provided with sectional ejector blades and a quick-change mold.

Second, to provide a safety attachment of this class which prevents the possibility of damage to the mold liners or ejector blades, due to the ejector blades being arranged to eject a longer slug than the length of the mold in use.

Third, to provide a safety attachment of this class which upon adjusting or changing the mold of a typesetting machine automatically sets the ejector blades operating mechanism so as to eject a predetermined minimum length of slug.

Fourth, to provide a safety attachment of this class in which the only possible damage occasioned by failure to change the setting of the sectional ejector blades upon changing the mold, is the spoiling of a slug which may be readily and quickly cast over.

Fifth, to provide a safety attachment of this class which may be installed without altering the conventional typesetting machine, as the parts of the safety attachment may be secured at the points of fastening of other parts and portions of the typesetting machine.

Sixth, to provide an attachment of this class which in no manner interferes with the normal use of the typesetting machine.

Seventh, to provide a novel means of linking the movement of the mold disk drive pinion of a typesetting machine with the sectional ejector blades, and Eighth, to provide on the whole a novelly arranged safety attachment for typesetting machines which is simple of construction proportional to its functions, durable, efficient in its action, and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawing and to the characters of reference thereon which form a part of this application, in which:

Figure 1 is a perspective view of my safety attachment with adjacent portions of a typesetting machine shown fragmentarily and by dotted lines; Fig. 2 is an elevational view of the lever engaged by the mold disk pinion showing also the casing for this lever with the cover plate removed and showing a portion of the connecting cable associated with the lever; Fig. 3 is an end elevational view of the structure illustrated in Fig. 2 showing by dotted lines the relation of the mold disk pinion gear; Fig. 4 is an enlarged sectional view through 4—4 of Fig. 2 showing the manner of joining the connecting cable to the pinion engaged lever; Fig. 5 is a fragmentary plan view of the actuated portion of my safety attachment; and Fig. 6 is a side elevational view thereof with parts and portions as shown in section to facilitate the illustration.

Similar characters of reference refer to similar parts and portions throughout the several views of the drawing.

Pinion gear engaged lever 1, pin 2, housing 3, set screw 4, connecting cable 5, connecting cable casing 6, fittings 7, bracket 8, latch handle 9, rocking lever 10, rocking lever pin 11, journal pin 12, post 13, spring 14 and set screw 15 constitute the principal parts and portions of my novel safety attachment for typesetting machines.

The typesetting machines which are provided with quick change molds and with sectional blades are provided with a pinion gear A, which is journaled by a portion of the frame work B of the typesetting machine so as to engage the periphery of the mold disk (not shown), and revolve it. The pinion gear is normally locked so as to rotate with its driving shaft, but may be pulled forward so as to revolve freely upon its shaft and enable manual rotation of the mold disk for changing the molds or mold liners. It is this forward movement of the pinion gear that is utilized in the operation of my safety attachment.

A lever 1 is provided which comprises a shorter, upwardly extending arm 1a, and a horizontally extending arm 1b. This lever is journaled on a pin 2 which is supported by a housing 3. One end of the housing 3 is split or bifurcated as indicated by 3a so as to receive the journaled portion of the lever. The remaining portion of the housing which forms a chamber 3b is closed by a cover plate which receives the longer arm 1b of the lever and is sufficiently large to allow the desired movement thereof.

The upper end of the shorter or vertical arm 1a of the lever 1 is provided with a horizontally disposed set screw 4, which has a rotatably mounted ball member 4a supported at its inner end and adapted to bear against the pinion gear A shown by dotted lines in Figs. 1, 2, and 3. The opposite or outer end of the set screw is provided with a lock nut 4b.

The housing 3 is provided with a bracket 3d which extends at right angles thereto and is securable to the framework B of the typesetting machine at a point immediately below the pinion gear A. Provision for one bolt is sufficient as there is provided a projection 3e which fits snugly under a shoulder forming a portion of the framework.

The horizontal arm 1b of the lever 1 is provided with a socket 1c formed in its upper side near its extremity. The socket 1c is intersected by a slot 1d, cut in the extremity of the lever. A connecting cable 5 is provided which comprises a plurality of ball members 5a, loosely connected together by small rod members 5b which allow the chain or cable thus formed to pass around a relatively sharp corner. The end ball member of the cable or chain 5 is adapted to fit in the socket 1c so that the adjacent rod member passes through the slot 1d. The chain or cable 5 extends downwardly from the extremity of the arm 1b and hollow boss portion 3c of the housing 3 into a casing 6.

The casing 6 is flexible and may be formed by winding a wire helically with the convolutions arranged in abutting relation, thus forming a casing of extreme flexibility. The casing is just long enough to slidably receive the ball member 5a of the connecting cable. The end of the casing 6 is joined to the hollow boss portion 3c by suitable fittings 7.

The cable 5 and its casing 6 extend under or over various parts of the typesetting machine to a point adjacent and rearwardly of the conventional bracket which supports the ejector blade controller lever. This bracket is replaced by a bracket 8 of my safety attachment.

The bracket 8 is mounted by means of a securing portion 8a having openings arranged therein corresponding to the location of openings in the conventional ejector blade controller lever bracket so that it may be bolted to the framework B as indicated in Fig. 1. From its secured portion 8a, the bracket 8 extends rearwardly a short distance over the framework B of the typesetting machine, and then upwardly forming a thickened supporting or body portion 8b.

The body portion 8b receives the conventional lever rod pin C which is shown by solid outline in the several views to distinguish it from the less intimately associated portions of the typesetting machine. The pin C journals the ejector lever rod D, also shown by solid outline for the same reason.

The ejector lever rod D comprises a pair of parallel disposed, offset arms D1 and D2 connected together by a cross portion D3. The lever is journaled intermediate the ends of the arms D1 on the pin C as shown in Figs. 1, 5 and 6.

A latch handle 9 is substituted in place of the conventional latch handle at the forward portion of the ejector blade controller lever D. The latch handle 9 is similar in most respects to the conventional latch handle, it being provided with depending lug portions 9a which straddle the ejector blade controller lever and a tongue portion 9b extending forwardly therefrom along the upper side of the ejector blade controller lever. Also similar to the conventional latch handle, the latch handle 9 is provided with a catch 9c which engages a toothed segment E of the typesetting machine, as well as being provided with a spring 9d arranged between the tongue portion 9b and the ejector blade controller lever D, for forcing the catch 9c into engagement with the segment E.

In fact, the only necessary change from that of the conventional latch handle is the provision of a rearwardly extending arm 9e which extends from one of the lugs 9a along the side of the arm D1 of the ejector blade controller lever D. The arm 9e terminates just forwardly of the supporting or body portion 8b of the bracket 8.

Supported from the body portion 8b of the bracket 8, on the opposite side thereof from the ejector blade controller lever D is a rocking lever 10 which is journaled intermediate its ends upon a rocking lever pin 11. The forward end of the lever pin 11 is bifurcated as indicated by 10a and is adapted to straddle the journal pin 12 secured to the extremity of the arm 9e. The other or rearward end 10b of the lever 10 is provided with a socket and slot similar in form and arrangement to the socket 1c and slot 1d of the lever 1, so as to receive the other end of the cable or chain 5.

The end 10b which receives the cable or chain 5 is vertically disposed over a horizontally arranged shelf portion 8c of the bracket 8. The shelf 8c is provided with an opening therethrough which receives a fitting 7 adapted to secure and connect the end of the casing 6 thereto.

Extending from the shelf portion 8c is an arm 8d which terminates underneath the junction of the cross portion D3 of the ejector blade controller lever D with the arm D1 thereof. Secured at the above point of the ejector blade lever D is a post 13 which extends upwardly therefrom as well as slightly inwardly. A spring 14 is adapted to connect the extremities of the post 13 and the arm 8d.

The post 13 is provided with a bifurcated portion 13a which straddles one extremity of the cross portion D3. The extremities of the bifurcated portion 13a are joined together by an integral U-shaped clip 13b arranged at right angles thereto so as to fit over the inner end of the arm D1, as shown best in Figs. 1 and 5. The extremities of the U-shaped clip 13b are adapted to receive a screw 13c which firmly locks the post upon the lever D.

The body portion 8b of the bracket is provided with an extension 8e which projects upwardly, forwardly and laterally until over the arm D1 of the ejector blade controller lever D. The extremity of the extension 8e receives a vertically disposed set screw 15 which is adapted to engage the ejector blade controller lever when said lever is elevated a predetermined amount. The set screw determines the minimum number of blades which the ejecting mechanism shall select.

In order to eliminate slack in the cable, there is provided a set screw 3f which extends upwardly through the underside of the housing so as to engage the underside of the arm 1b of the lever 1 and limit its downward movement. The set screw 4 is adjusted so as to cause the required arcuate movement of the lever 1.

Operation of my safety attachment is as follows:

Supposing that the mold disk and ejector blades are set for casting and ejecting a 30 em slug and it is desired to change the mold to the 8 em mold. This is accomplished by operation of the pinion gear A, which in the conventional typesetting machine is first pulled outwardly in order to rotate the mold disk to a new position for changing the molds or liners as has been pointed out hereinbefore. This outward movement of the pinion gear automatically shifts the lever 1 and the chain or cable 5, which actuates the rocking lever 10 which in turn rotates the catch handle 9 so that the catch 9c disengages the rack quadrant or segment E. Thereupon, the spring 14 and further movement of the cable 5 shifts the arm D1 of the ejector blade controller lever upwardly until engaged by the screw 15. At this position, the number of ejector blades set for operation total a width which is the same or less than the smallest mold carried by the mold disk. Now, should the operator attempt to cast a slug without resetting the ejector blade, the slug is broken and only part thereof is ejected. Hence, in order to remedy his mistake, all the operator need do is to set the ejector blades so as to remove the remaining portion of the previously cast slug and then recast the line of type.

It can readily be seen that there is no danger of the ejector blades or the mold liners becoming damaged.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a safety attachment for typesetting machines, the combination with a typesetting machine having a mold disk drive pinion and ejector blades selected by an ejector blade lever, of a casing member supported from the framework of the typesetting machine, and extending outwardly therefrom below said mold disk drive pinion, a lever means journaled within said casing member having an arm extending upwardly into engagement with said pinion, a bracket supporting said ejector blade lever, a catch latch supported by said ejector blade lever and normally holding the movement thereof, said catch latch being capable of limited movement relative to said ejector blade lever so as to release the same and thereupon shift with said ejector blade lever, a flexible casing secured to and communicating with said casing member and secured at its other end to said bracket, a flexible link means threaded through said flexible casing and operatively connecting said lever means with said catch latch whereby movement of said lever means causes said catch latch to release and shift said ejector blade lever so as to select a predetermined number of ejector blades.

2. In a safety attachment for typesetting machines, the combination with a typesetting machine having a mold disk drive pinion and ejector blades selected by an ejector blade lever, of a casing member supported from the framework of the typesetting machine, and extending outwardly therefrom below said mold disc drive pinion, a lever means journaled within said casing member having an arm extending upwardly into engagement with said pinion, a bracket supporting said ejector blade lever, a catch latch supported by said ejector blade lever and normally holding the movement thereof, said catch latch being capable of limited movement relative to said ejector blade lever so as to release the same and thereupon shift with said ejector blade lever, a flexible casing secured to and communicating with said casing member and secured at its other end to said bracket, a flexible link means threaded through said flexible casing and operatively connecting said lever means with said catch latch whereby movement of said lever means causes said catch latch to release and shift said ejector blade lever so as to select a predetermined number of ejector blades, a post member secured to said ejector blade lever, an arm extending from said bracket, and a spring connecting said post member and said arm for assisting the action of said flexible link means.

3. In a safety attachment for typesetting machines, the combination with a typesetting machine having a mold disk drive pinion and ejector blades selected by an ejector blade lever, of a casing member supported from the framework of the typesetting machine, and extending outwardly therefrom below said mold disk drive pinion, a lever means journaled within said casing member having an arm extending upwardly into engagement with said pinion, a bracket supporting said ejector blade lever, a catch latch supported by said ejector blade lever and normally holding the movement thereof, said catch latch being capable of limited movement relative to said ejector blade lever so as to release the same and thereupon shift with said ejector blade lever, a flexible casing secured to and communicating with said casing member and secured at its other end to said bracket, a flexible link means threaded through said flexible casing, a pivot lever supported from said bracket, the one end thereof attached to said link means, the other end to said catch latch so as to shift said catch latch and release said ejector blade lever, and a spring extending from said bracket to said ejector blade lever for shifting said ejector blade lever to a position controlling a predetermined minimum number of ejector blades.

DENIS P. McLAUGHLIN.